(12) United States Patent
Salter et al.

(10) Patent No.: US 9,434,304 B2
(45) Date of Patent: Sep. 6, 2016

(54) ILLUMINATED VEHICLE COMPARTMENT

(71) Applicant: Ford Global Technologies, LLC, Dearborn, MI (US)

(72) Inventors: Stuart C. Salter, White Lake, MI (US); Cornel Lewis Gardner, Romulus, MI (US); James J. Surman, Clinton Townhsip, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/718,867

(22) Filed: May 21, 2015

(65) Prior Publication Data

US 2015/0251597 A1    Sep. 10, 2015

Related U.S. Application Data (63) Continuation-in-part of application No. 14/603,636, filed on Jan. 23, 2015, which is a continuation-in-part of application No. 14/086,442, filed on Nov. 21, 2013.

(51) Int. Cl.
*B60Q 1/00* (2006.01)
*B60Q 1/26* (2006.01)
*B60Q 11/00* (2006.01)
(Continued)

(52) U.S. Cl.
CPC ............... *B60Q 3/06* (2013.01); *B60Q 3/008* (2013.01); *F21K 9/56* (2013.01); *H05B 37/0218* (2013.01); *H05B 37/0227* (2013.01); *F21Y 2101/02* (2013.01); *Y02B 20/46* (2013.01)

(58) Field of Classification Search
CPC ........... B60Q 3/008; B60Q 3/06; F21K 9/56; H05B 37/0218; H05B 37/0227
USPC .................. 362/487, 496, 502, 509–510
See application file for complete search history.

(56) References Cited

U.S. PATENT DOCUMENTS

| 5,709,453 A | 1/1998 | Krent et al. |
| 6,371,637 B1 | 4/2002 | Atchinson et al. |

(Continued)

FOREIGN PATENT DOCUMENTS

| CN | 101337492 A | 1/2009 |
| CN | 201169230 Y | 2/2009 |

(Continued)

OTHER PUBLICATIONS

Aac style, web page, http://www.automotivelightstore.com/oracleenginebayledlightingkit.aspx, date unknown, 3 pages.

(Continued)

*Primary Examiner* — Jason Moon Han
(74) *Attorney, Agent, or Firm* — Vichit Chea; Price Heneveld LLP (57) ABSTRACT

An illuminated engine compartment disposed within a vehicle is provided herein. The illuminated engine compartment includes a light-producing assembly. A first luminescent portion is disposed on the light-producing assembly and is configured to luminesce in response to excitation by the light-producing assembly. A second luminescent portion is disposed on a feature within the vehicle engine compartment and is configured to luminesce in response to light emitted from the light-producing assembly.

16 Claims, 8 Drawing Sheets

(51) Int. Cl.
*B60Q 3/06* (2006.01)
*F21K 99/00* (2016.01)
*H05B 37/02* (2006.01)
*B60Q 3/00* (2006.01)
*F21Y 101/02* (2006.01)

(56) References Cited

U.S. PATENT DOCUMENTS

| | | |
|---|---|---|
| 6,729,738 B2 | 5/2004 | Fuwausa et al. |
| 6,773,129 B2 | 8/2004 | Anderson, Jr. et al. |
| 6,851,840 B2 | 2/2005 | Ramamurthy et al. |
| 6,871,986 B2 | 3/2005 | Yamanaka et al. |
| 6,990,922 B2 | 1/2006 | Ichikawa et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 8,820,965 B2 | 9/2014 | McNabb et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2011/0109235 A1 | 5/2011 | Link |
| 2012/0001406 A1 | 1/2012 | Paxton et al. |
| 2012/0280528 A1 | 11/2012 | Dellock et al. |
| 2013/0335994 A1 | 12/2013 | Mulder et al. |
| 2014/0076397 A1 | 3/2014 | Wagenblast et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| DE | 10336176 A1 | 12/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

OTHER PUBLICATIONS

ACC Green LED Mustang Engine Shroud Covers Illuminated 5.0 GT 9Pc Polished/Brushed 2011-2014-273028-GRN, web page, http://d2bdmotorwerks.com/i-17705672-acc-green-led-mustang-engine-shroud-covers-illuminated-5-0-gt-9pc-polished-brushed-2011-2014-273028-grn.html, date unknown, 2 pages.

24" 12 Volt DC Flexible LED Light Strips—Blue, web page, http://www.mcmelectronics.com/product/DISTRIBUTED-BY-MCM-NL-F524CB-BL-/25-5546, date unknown, 3 pages.

ILLUMINATED VEHICLE COMPARTMENT

CROSS-REFERENCE TO RELATED APPLICATIONS

This application is a continuation-in-part of U.S. patent application Ser. No. 14/603,636, filed Jan. 23, 2015, entitled "DOOR ILLUMINATION AND WARNING SYSTEM" which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, an illuminated compartment for a vehicle is provided. The illuminated compartment includes a light-producing assembly. A first luminescent portion is disposed on the light-producing assembly and is configured to luminesce in response to excitation by the light-producing assembly. A second luminescent portion is disposed on a feature within the vehicle engine compartment that is configured to luminesce in response to excitation by the light-producing assembly.

According to another aspect of the present invention, a lighting system for a vehicle is provided. The lighting system includes a printed LED capable of being coupled to a vehicle surface. A first photoluminescent structure partially covers the printed LED and is configured to luminesce in response to excitation by the printed LED. A light transmissive portion is disposed adjacently to the first photoluminescent portion. A second photoluminescent portion is configured to luminesce in response to light emitted from the printed LED.

According to another aspect of the present invention, an illuminated compartment is provided. A light-producing assembly emits light at a first wavelength. A first photoluminescent portion is arranged over the light-producing assembly and is configured to luminesce in response to excitation by the light-producing assembly. A fraction of the light passes through the photoluminescent structure at the first wavelength. A second photoluminescent portion is disposed within the compartment that luminesces in response to the light at the first wavelength.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing features A, B, and/or C, the composition can contain A alone; B alone; C alone; A and B in combination; A and C in combination; B and C in combination; or A, B, and C in combination.

The following disclosure describes an illuminated engine compartment for a vehicle. The compartment may advantageously employ one or more photoluminescent structures to illuminate in response to pre-defined events. The one or more photoluminescent structures may be configured to convert light received from an associated light source and re-emit the light at a different wavelength typically found in the visible spectrum. In some embodiments, the light source may implement a thin design, thereby helping to fit the light source into small package spaces of the vehicle where traditional light sources may not be practicable.

Figure 1A:
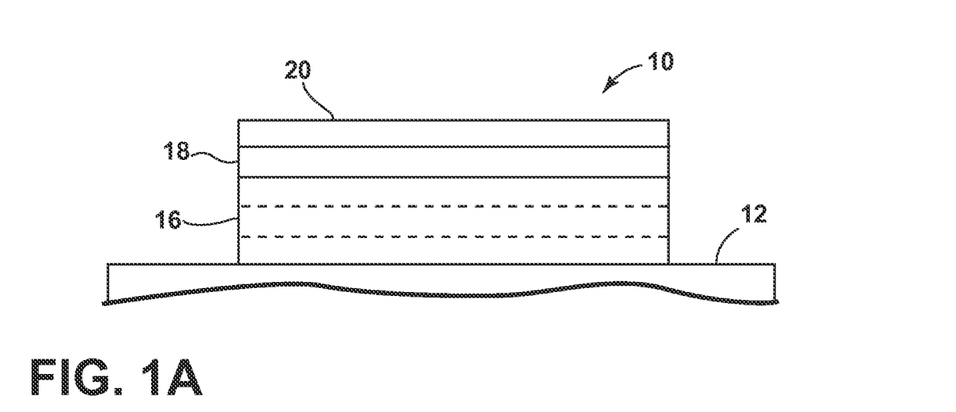
FIG. 1A is a side view of a photoluminescent structure rendered as a coating for use in a luminescent trim light assembly according to one embodiment.
Figure 1B:
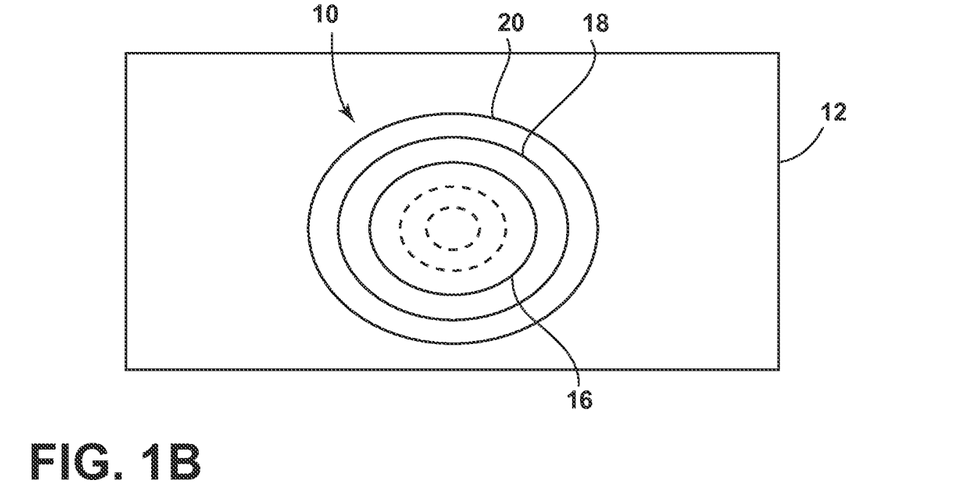
FIG. 1B is a top view of a photoluminescent structure rendered as a discrete particle according to one embodiment.
Figure 1C:
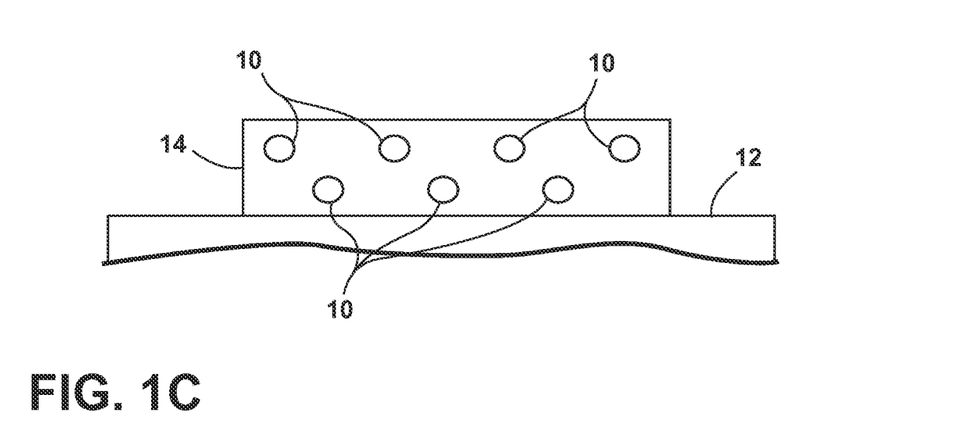
FIG. 1C is a side view of a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various embodiments discussed herein, each of the photoluminescent structures 10 may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate 12 by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g., the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

Figure 2:
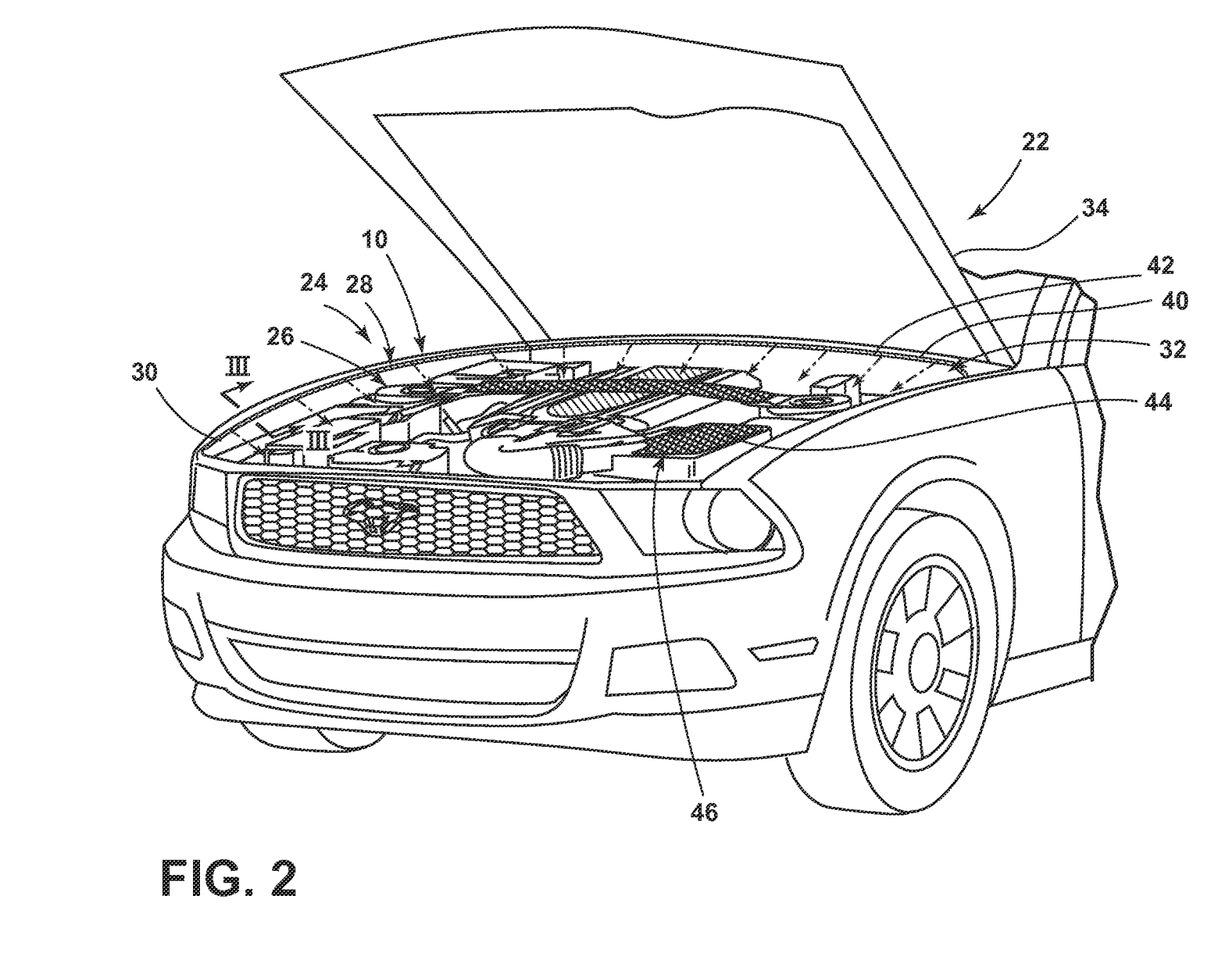
FIG. 2 illustrates a perspective view of a vehicle engine compartment employing an illumination system according to one embodiment.

Referring to FIG. 2, a perspective view of a vehicle 22 is shown demonstrating a lighting system 24 configured to illuminate a portion of a vehicle engine compartment 26. The lighting system 24 may include a light source 28 disposed on an interior surface 30 of a periphery 32 of the engine compartment 26 and a photoluminescent portion 42. The photoluminescent portion 42 contains at least one photoluminescent material. As discussed herein, the compartment 26 may include a closure that corresponds to a hood 34, cover, lid, or door configured to enclose an opening such as a compartment of the vehicle 22. In exemplary embodiments, the closure may refer at least one of a vehicle hood 34 configured to enclose an engine compartment 26 and/or a deck lid, trunk lid configured to enclose a cargo compartment. In alternate embodiments, the closure may correspond to a hatch or door of a vehicle 22.

Figure 3A:
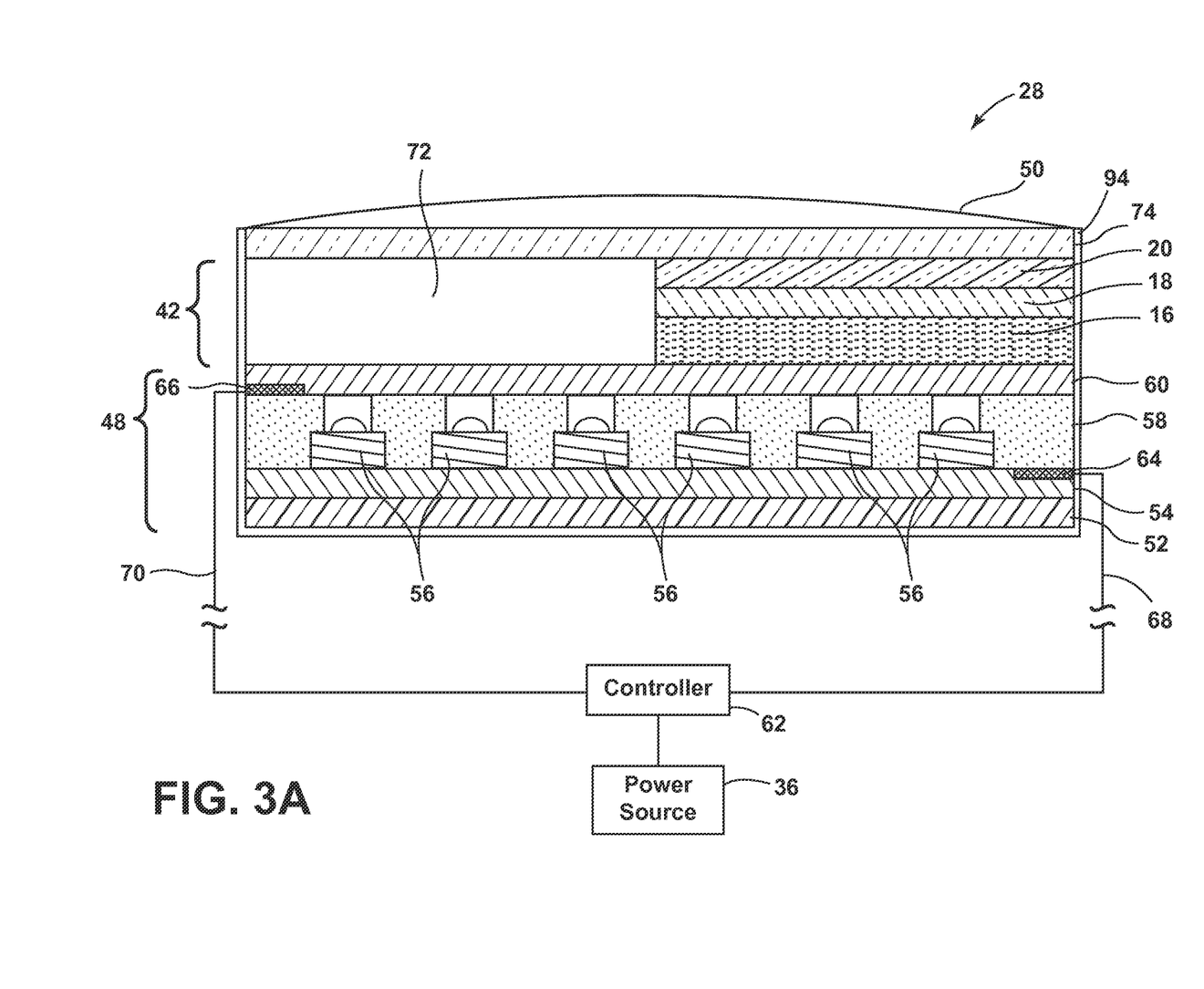
FIG. 3A is a cross-sectional view taken along line III-III of FIG. 2 illustrating a light source according to one embodiment.

The light source 28 may be positioned under a portion of the periphery 32 of the engine compartment 26 and configured to illuminate the vehicle engine compartment 26 when the vehicle hood 34 is in an open position. The light source 28 may be arranged as a strip and may be powered using a vehicle power supply 36 (FIG. 3A). Additionally, the light source 28 may include one or more light emitting diodes 40 (LED) and may also include optics 38 configured to disperse or focus light being emitted therefrom. For example, optics 38 may be utilized for directing a first portion of light emitted from the light source 28 along a portion of the periphery 32 for backlighting of the compartment 26. A second portion of light emitted from the light source 28 may be directed towards the engine compartment 26 and/or any components disposed therein. The light source 28 may be located on any surface on the compartment 26. According to one embodiment, the light source 28 is disposed around the periphery 32 of the compartment to reduce the amount of heat exposure during operation of the vehicle 22. Additionally, when the hood 34 is closed, the light source 28 may be located proximate a radiator or other cooling source so that the light source 28 is not damaged by heat radiating from the engine.

In some embodiments, a plurality of photoluminescent portions 42, 44 may be disposed within the lighting system 24. The light source 28 is configured to output a first wavelength of light 76 (FIG. 3A). In response to receiving the light 76 at the first wavelength, any of the plurality of photoluminescent portions 42, 44 may become illuminated and emit light at least a second wavelength, as described above. Additionally, each photoluminescent portion 42, 44 may illuminate light in response to a different wavelength of light such that certain features 46 may be selectively illuminated.

The plurality of photoluminescent portions 42, 44 may correspond to any number of features 46 located in the vehicle engine compartment 26. Additionally, any number of the photoluminescent portions 42, 44 may be disposed on and/or in surfaces proximate the light source 28, such as on the interior surface 30 of the hood 34 of the vehicle 22. In the illustrated embodiment, the lighting system 24 comprises a first photoluminescent portion 42 disposed on a fraction of the light source 28 and a second photoluminescent portion 44 disposed on a feature 46 within the vehicle engine compartment 26. The first photoluminescent portion 42 may correspond to a utility light configured to emit a high intensity light to illuminate the engine compartment 26. The second photoluminescent portion 44 may be configured to illuminate the at least one feature 46 to assist in identifying and/or illuminating a feature 46 within the engine compartment 26.

Each of the plurality of photoluminescent portions 42, 44 may incorporate one or more photoluminescent structures 10 configured to emit a specific color light in response to the excitation generated in response to the light 76 emitted from the light source 28. In some embodiments, a combination of photoluminescent structures 10 may be utilized in the photoluminescent portions 42, 44 to output various wavelengths corresponding to different colors of light. For example, the utility light may be configured to emit a combination of red light, green light, and blue light to generate a light having a substantially white appearance. The lighting system 24 may provide various benefits including a cost-effective method for illuminating an engine compartment 26 and incorporating ambient lighting to at least one feature 46 proximate the engine compartment 26.

Figure 3B:
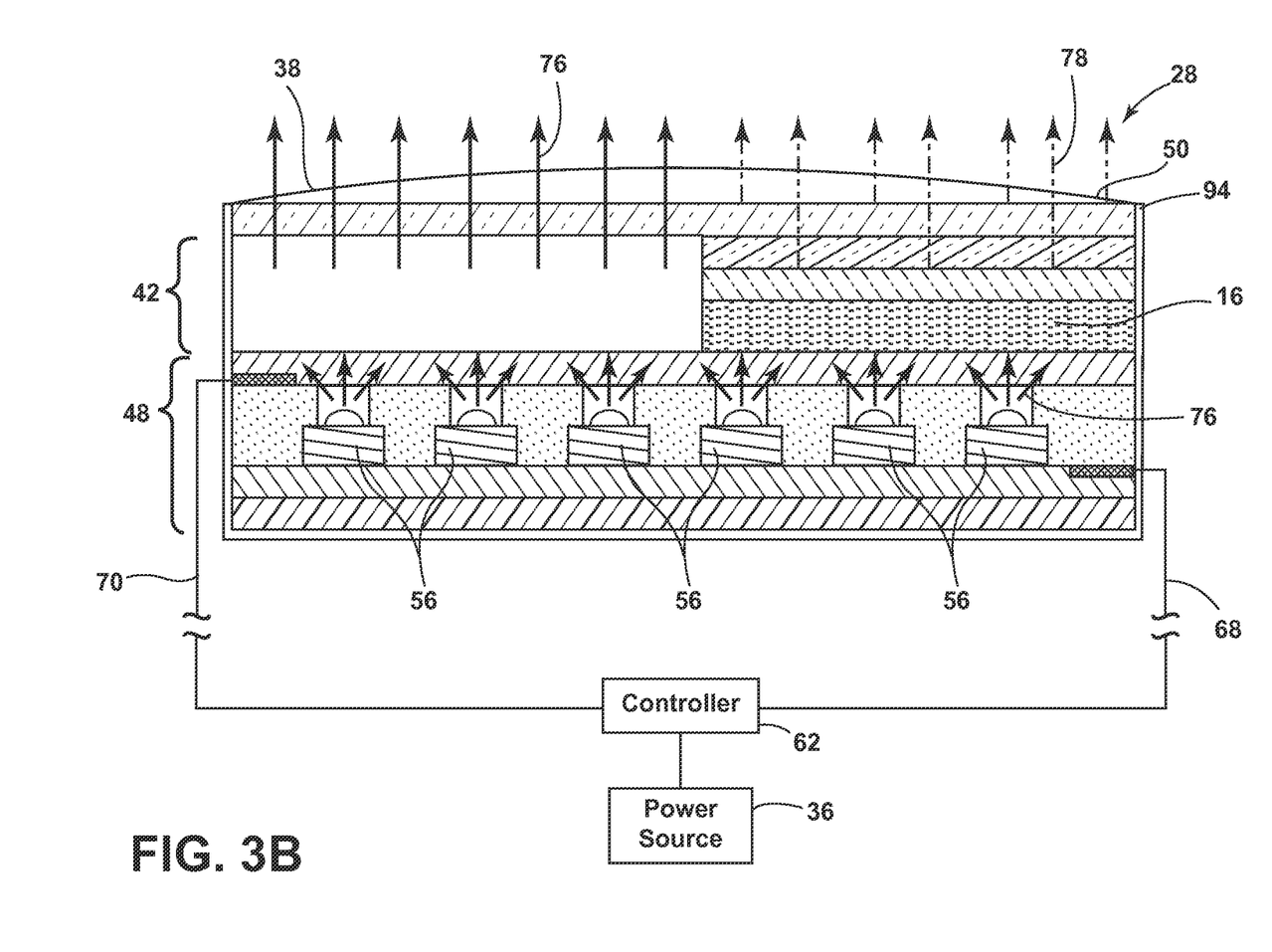
FIG. 3B is a cross-sectional view taken along line III-III of FIG. 2 further illustrating the light source, according to one embodiment.
Figure 3C:
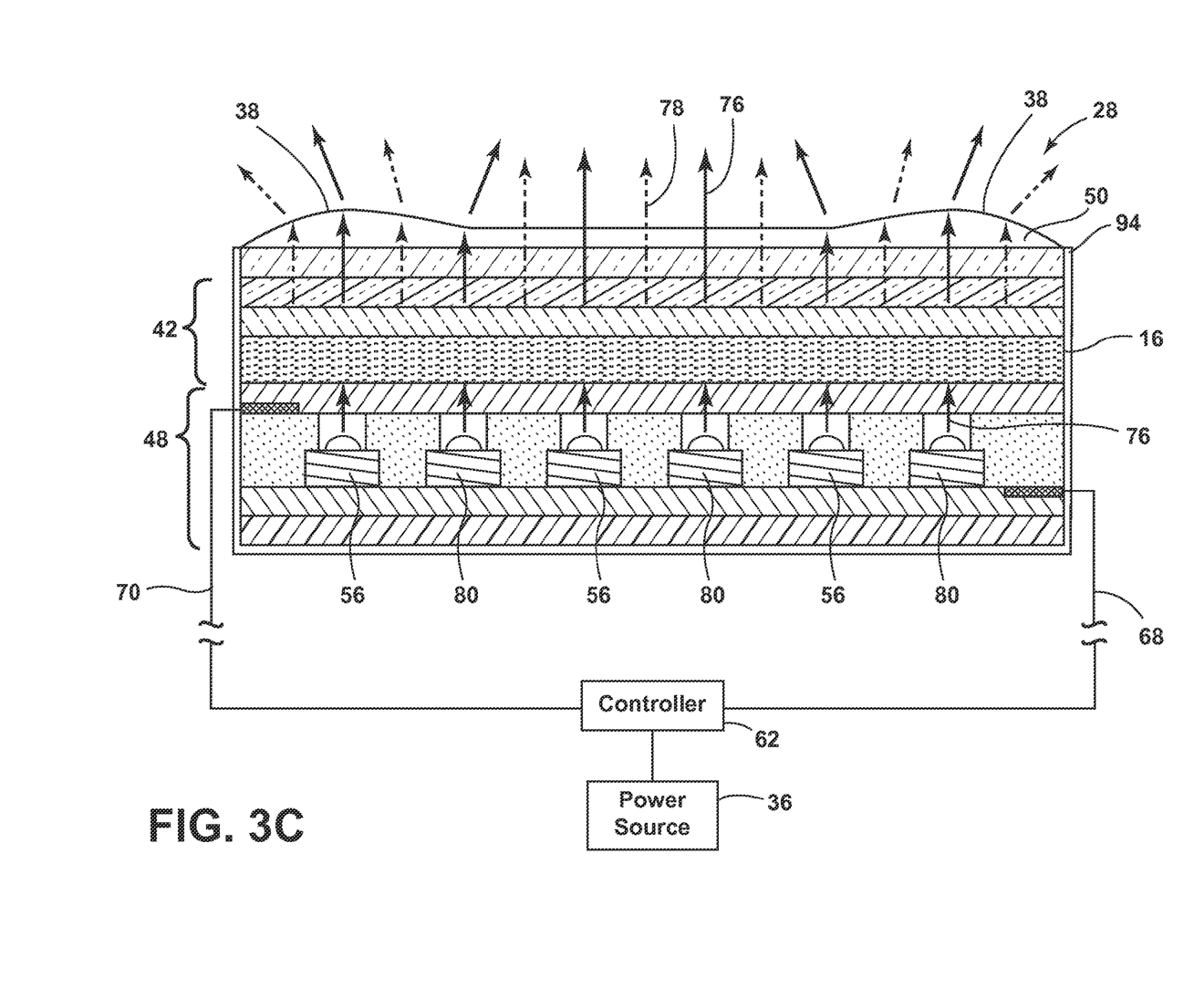
FIG. 3C is a cross-sectional view taken along line III-III of FIG. 2 illustrating an alternate light source, according to one embodiment.

Referring to FIGS. 3A-3C, a cross-sectional view of the light source 28 capable of use on a vehicle 22 with an external photoluminescent portion 42 is shown according to one embodiment. As illustrated in FIG. 3A, the light source 28 may have a stacked arrangement that includes a light-producing assembly 48, a photoluminescent portion 42 having a photoluminescent structure 10 therein, a viewable portion 50, and an overmold material 94 surrounding the light-producing assembly 48 and a portion of the photoluminescent portion 42. It should be appreciated that the viewable portion 50 and the overmold material 94 may be two separate components, or may be integrally formed as a single component.

The light-producing assembly 48 may correspond to a thin-film or printed light emitting diode (LED) assembly and include a substrate 52 as its lowermost layer. The substrate 52 may include a polycarbonate, poly-methyl methacrylate (PMMA), or polyethylene terephthalate (PET) material on the order of 0.005 to 0.060 inches thick and is arranged over the intended vehicle surface on which the light source 28 is to be received (e.g., interior surface 30 of the vehicle hood 34). Alternatively, as a cost saving measure, the substrate 52 may directly correspond to a preexisting vehicle structure (e.g., periphery 32 of the engine compartment 26, interior surface of the hood 34, exterior panels, and/or interior panels).

The light-producing assembly 48 includes a positive electrode 54 arranged over the substrate 52. The positive electrode 54 includes a conductive epoxy such as, but not limited to, a silver-containing or copper-containing epoxy. The positive electrode 54 is electrically connected to at least a portion of a plurality of LED sources 40 arranged within a semiconductor ink 58 and applied over the positive electrode 54. Likewise, a negative electrode 60 is also electrically connected to at least a portion of the LED sources 40. The negative electrode 60 is arranged over the semiconductor ink 58 and includes a transparent or translucent conductive material such as, but not limited to, indium tin oxide. Additionally, each of the positive and negative electrodes 54, 60 is electrically connected to a controller 62 and a power supply 36 via a corresponding bus bar 64, 66 and conductive leads 68, 70. The bus bars 64, 66 may be printed along opposite edges of the positive and negative electrodes 54, 60 and the points of connection between the bus bars 64, 66 and the conductive leads 68, 70 may be at opposite corners of each bus bar 64, 66 to promote uniform current distribution along the bus bars 64, 66.

The semiconductor ink 58 can be applied through various printing processes, including ink 58 jet and silk screen processes to selected portion(s) of the positive electrode 54. More specifically, it is envisioned that the LED sources 40 are dispersed within the semiconductor ink 58. Further, the LED sources 40 may be shaped and sized such that a substantial quantity thereof aligns with the positive and negative electrodes 54, 60 during deposition of the semiconductor ink 58. The portion of the LED sources 40 that ultimately are electrically connected to the positive and negative electrodes 54, 60 may be illuminated by a combination of the bus bars 64, 66, controller 62, power supply 36, and conductive leads 68, 70. According to one embodiment, the power supply 36 may correspond to a vehicular power supply 36 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 3A, the first photoluminescent portion 42 is arranged over the negative electrode 60 as a coating, layer, film or other suitable deposition, as described above. With respect to the presently illustrated embodiment, the photoluminescent portion 42 may be arranged as a multi-layered structure including an energy conversion layer 16, an optional stability layer 18, and an optional protection layer 20. The photoluminescent portion 42 is disposed in a patterned manner with light transmissive portions 72 therebetween. Thus, a first portion of light 76 emitted from the light source 28 passes through the photoluminescent portion 42 while a second portion of the light 76 emitted from the light source 28 does not pass through the photoluminescent portion 42 and is thereby emitted towards the engine compartment 26 without converting to a different wavelength than that emitted from the light source 28.

The energy conversion layer 16 includes a photoluminescent material having energy converting elements with phosphorescent or fluorescent properties. For example, the photoluminescent material may include organic or inorganic fluorescent dyes including rylenes, xanthenes, porphyrins, phthalocyanines. Additionally or alternatively, the photoluminescent material may include phosphors from the group of Ce-doped garnets such as YAG:Ce. The energy conversion layer 16 may be applied to the negative electrode 60 by painting, screen printing, flexography, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix formed by extrusion, injection molding, compression molding, calendaring, thermoforming, etc.

To protect the photoluminescent material contained within the energy conversion layer 16 from photolytic and thermal degradation, the photoluminescent portion 42 may include the stability layer 18. The stability layer 18 may be configured as a separate layer optically coupled and adhered to the energy conversion layer or otherwise integrated therewith. The photoluminescent portion 42 may also include the protection layer 20 optically coupled and adhered to the stability layer 18 or other layer (e.g., the energy conversion layer 16 in the absence of the stability layer 18) to protect the photoluminescent portion 42 from physical and chemical damage arising from environmental exposure.

In operation, the photoluminescent material within each photoluminescent portion 42, 44 is formulated such that the inputted light 76 undergoes an energy conversion process and is re-emitted at a different wavelength 78. According to one embodiment, the photoluminescent material may be formulated to convert inputted light 76 into a longer wavelength light 78, otherwise known as down conversion. Alternatively, the photoluminescent material may be formulated to convert inputted light 76 into a shorter wavelength light 78, otherwise known as up conversion. Under either approach, light 78 converted by the photoluminescent material may be immediately outputted from the photoluminescent portion 42 or otherwise used in an energy cascade, wherein the converted light 78 serves as inputted light to excite another formulation of photoluminescent material located within the energy conversion layer 16, whereby the subsequent converted light may then be outputted from the photoluminescent portion 42 or used as inputted light, and so on. With respect to the energy conversion processes described herein, the difference in wavelength between the inputted light 76 and the converted light 78 is known as the Stokes shift and serves as the principle driving mechanism for an energy conversion process corresponding to a change in wavelength of light.

With continued reference to FIG. 3A, the viewable portion 50 is arranged over the first photoluminescent portion 42 and light transmissive portions 72. In some embodiments, the viewable portion 50 may include a plastic, silicon, or urethane material that is molded over the first photoluminescent portion 42 and the light-producing assembly 48. Preferably, the viewable portion 50 should be transparent, or at least translucent, in regards to converted light 78 outputted from the first photoluminescent portion 42. In this manner, the viewable portion 50 will be illuminated by the first photoluminescent portion 42 whenever an energy conversion process is underway. Additionally, by over-molding the viewable portion 50, it may also function to protect the photoluminescent structure and the light-producing assembly 48. The viewable portion 50 may be arranged in a planar shape and/or an arcuate shape to enhance its viewing potential when in an illuminated and/or luminescent state. Like the first photoluminescent portion 42 and the light-producing assembly 48, the viewable portion 50 may also benefit from a thin design, thereby helping to fit the light source 28 into small package spaces of the vehicle 22 (e.g., on the interior surface 30 of the hood 34).

Alternatively, in some embodiments, a decorative layer 74 may be disposed between the viewable portion 50 and the first photoluminescent portion 42 and light transmissive portions 72. The decorative layer 74 may include a polymeric material or other suitable material and is configured to control or modify an appearance of the viewable portion 50 of the light source 28. For example, the decorative layer 74 may be configured to confer a metallic appearance to the viewable portion 50 when the viewable portion 50 is in an unilluminated state. In other embodiments, the decorative layer 74 may be tinted any color to complement the vehicle 22 structure on which the light source 28 is to be received. In any event, the decorative layer 74 should be transparent, or at least translucent, such that the photoluminescent portion 42, or light source(s) 28, is not prevented from illuminating the viewable portion 50 whenever the light source(s) 28 is illuminated.

The decorative layer 74 may also provide information about the vehicle 22, or features 46 contained thereon. For example, text may be disposed within the decorative layer 74 that includes the same photoluminescent material as the feature 46 the text describes, thereby creating a key for the features 46 that luminesce in response to the light source 28. According to one exemplary embodiment, an oil cap 82 (FIG. 5A) includes a photoluminescent portion 44 thereon. Text having the same photoluminescent material therein may be disposed in the decorative layer 74 such that a user can quickly identify the location of the oil cap 82, and the purpose of the container for which the cap 82 covers.

The overmold material 94 is disposed around the light-producing assembly 48 and photoluminescent portion 42. The overmold material 94 may protect the light-producing assembly 48 from a plurality of environmental conditions, such as preventing humidity from affecting the light-producing assembly 48. The overmold material 94 may have viscoelasticity (i.e. having both viscosity and elasticity), a low Young's modulus, and/or high failure strain compared with other materials so that the overmold material 94 may protect the light-producing assembly 48 from contact.

Additionally, it is contemplated that the photoluminescent portion 42 may be employed on the light-producing assembly 48 and/or separate and away from the light-producing assembly 48. For example, the photoluminescent portion 42 may be positioned on a vehicle feature 46 or surface proximate, but not in physical contact, with the light-producing assembly 48, as described herein. It should be understood any additional photoluminescent portions 44 may have a similar structure to the photoluminescent portion 42 disposed on a fraction of the light source 28.

Referring to FIG. 3B, a light-producing assembly 48 having the first photoluminescent portion 42 disposed on a fraction, or portion, thereof is illustrated according to one embodiment. The first photoluminescent portion 42 is configured to convert inputted light 76 received from LED sources 40 into a visible light 78 having a wavelength different than the wavelength associated with the inputted light 76. More specifically, the first photoluminescent portion 42 is formulated to have an absorption spectrum that includes the emission wavelength of the inputted light 76 supplied from the LED sources 40. The photoluminescent material is also formulated to have a Stokes shift resulting in the converted visible light 78 having an emission spectrum expressed in a desired color, which may vary per lighting application. The converted visible light 78 is outputted from the light-producing assembly 48 via the viewable portion 50, thereby causing the viewable portion 50 to illuminate in the desired color. In one embodiment, the first photoluminescent portion 42 utilizes down conversion, whereby the inputted light 76 includes light on the lower end of the visibility spectrum such as blue, violet, or ultraviolet (UV) light. Doing so enables blue, violet, or UV LEDs to be used as the LED sources 40, which may offer a relative cost advantage over simply using LEDs of the desired color and foregoing the energy conversion, process altogether. Furthermore, the illumination provided by the viewable portion 50 offers a unique and attractive viewing experience that may be difficult to duplicate through non-photoluminescent means.

The first photoluminescent portion 42 may be applied to only a fraction of the light-producing assembly 48. Light transmissive portions 72 that allow light 76 emitted from the LED sources 40 to pass therethrough at the first wavelength may be disposed in the locations that do not include the first photoluminescent portion 42. The light transmissive portions 72 may be an open space, or may be a transparent or translucent material that allows light 76 emitted from the light source 28 to pass therethrough. The light 76 emitted through the light transmissive portions 72 may be directed from the light-producing assembly 48 towards the vehicle engine compartment 26. As described herein, features 46 within the vehicle engine compartment 26 may have photoluminescent portions 44 disposed therein that luminesce in response to the light 76 emitted from the light-producing assembly 48 and directed through the light transmissive portions 72.

Referring to FIG. 3C, an alternate embodiment of the light-producing assembly 48 and first photoluminescent portion 42 is illustrated. In this embodiment, the first photoluminescent portion 42 is disposed over a substantial portion of the negative electrode 60 of the light-producing assembly 48. Also, it should be appreciated that the energy conversion layer 16 may include more than one photoluminescent material, in which case, the teachings provided herein similarly apply. In one embodiment, the second energy conversion process occurs by way of down conversion using blue, violet, and/or UV light as the source of excitation.

With respect to the presently illustrated embodiment, the excitation of photoluminescent material is formulated such that a portion of light 76 emitted from the light-producing assembly 48 passes through the first photoluminescent portion 42 at the first wavelength (i.e. the light 76 emitted from the light-producing assembly 48 is not converted by the first photoluminescent portion 42). The intensity of the emitted light 76 may be modified by pulse-width modulation or current control to vary the amount of light 76 emitted from the LED sources 40 that passes through the first photoluminescent portion 42 without converting to a second wavelength 78. For example, if the light source 28 is configured to emit light 76 at a low level, substantially all of the light 76 may be converted to the second wavelength 78. In this configuration, a color of light corresponding to the first photoluminescent portion 42 may be emitted from the light-producing assembly 48 and directed towards the engine compartment 26 for use as a utility light. If the light source 28 is configured to output the first wavelength 76 at a high level, only a portion of the first wavelength 76 may be converted by the first photoluminescent portion 42. In this configuration, a first fraction of the emitted light 76 may be converted by the first photoluminescent portion 42 and a second fraction of the light 76 may be emitted from the light-producing assembly 48 at the first wavelength towards additional photoluminescent portions 44 within the vehicle engine compartment 26.

In formulating the photoluminescent materials, care should be taken in choosing the associated Stoke shifts such that the converted light 78 emitted from one of the photoluminescent materials, does not excite another photoluminescent portion, unless so desired. According to one exemplary embodiment, a first portion of the LED sources, exemplarily shown as LED sources 40 is configured to emit an inputted light 76 having a wavelength that excites the photoluminescent material within the first photoluminescent portion 42 and results in the inputted light 76 being converted into a visible light 78 of a first color (e.g., white). Likewise, a second portion of the LED sources, exemplarily shown as LED sources 80, is configured to emit an inputted light 76 having a wavelength that passes through the light transmissive portions 72 of the first photoluminescent portion 42 and excites additional photoluminescent portions 44 disposed within the engine compartment 26 thereby illuminating in a second color. The first and second colors may be visually distinguishable from one another. In this manner, LED sources 40, 80 and may be selectively activated using the controller 62 to cause the photoluminescent structure to luminesce in a variety of colors. For example, the controller 62 may activate only LED sources 40 to exclusively excite the first photoluminescent portion 42, resulting in the viewable portion 50 illuminating in the first color. Alternatively, the controller 62 may activate only LED sources 80 to exclusively excite the photoluminescent portions 44, 82 disposed within the engine compartment 26, resulting in minimal illumination of the viewable portion 50, and luminescence of the desired features 46 within the engine compartment 26. Alternatively still, the controller 62 may activate LED sources 40, 80 in concert, which causes any of the photoluminescent portions 42, 44, 82 to become excited, resulting in the viewable portion 50 and the features 46 in the engine compartment 26 illuminating simultaneously. Contemplated colors include red, green, blue, and combinations thereof, including white, all of which may be achieved by selecting the appropriate photoluminescent materials and correctly manipulating the corresponding LED sources 40, 80.

The light-producing assembly 48 may also include optics 38, or lenses, that are configured to direct light 76 emitted from the LED sources 40, 80 and the light 78 emitted from the first photoluminescent portion 42 at pre-defined locations. For example, light 76 emitted from the LED sources 40, 80 and the first photoluminescent portion 42 may be directed and/or focused towards a desired feature 46 and/or location within the vehicle engine compartment 26.

Figure 4:
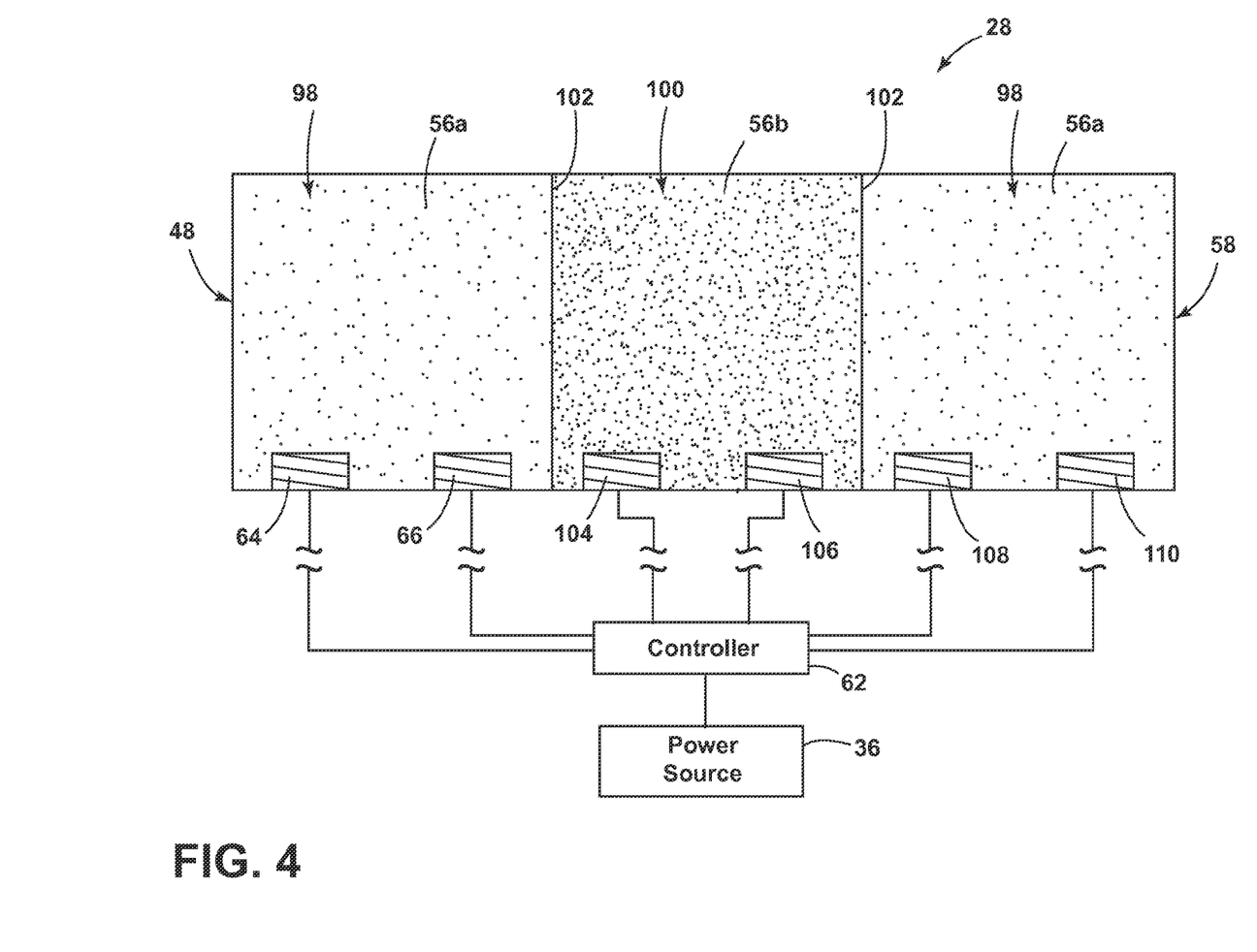
FIG. 4 illustrates a top view of a light-producing assembly, according to one embodiment, having varying types and concentrations of LED sources transversely along the light-producing assembly.

Referring to FIG. 4, a light-producing assembly 48, according to one embodiment, is illustrated from a top view having varying types and concentrations of LED sources 56 transversely along the light-producing assembly 48. As illustrated, a first portion 98 of the light-producing assembly 48 includes LED sources 56, exemplarily shown as LED sources 56a, that are configured to emit an inputted light 98 having an emission wavelength in a first color (e.g., white) spectrum. Likewise, a second portion 100 of the light-producing assembly 48 includes LED sources 56, exemplarily shown as LED sources 56b, that are configured to emit an inputted light 98 having an emission wavelength in a second color (e.g., red) spectrum. The first and second portions of the light-producing assembly 48 may be separated by insulative, or non-conductive, barriers 102 from proximately disposed portions through any means known in the art such that each portion 98, 100 may be illuminated independently of any other portion 98, 100. Further, each portion 98, 100 disposed within the light-producing assembly 48 may include a respective bus bar 64, 66, 104, 106, 108, 110 coupled to the controller 62 and configured to illuminate each respective portion 98, 100.

Preferably, the first and second colors are visually distinguishable from one another. In this manner, LED sources 56a and 56b may be selectively activated using the controller 62 to cause the LED sources 56a, 56b to illuminate in a variety of colors. For example, the controller 62 may activate only LED sources 56a to exclusively illuminate a portion 98 of the light-producing assembly 48 in the first color. Alternatively, the controller 62 may activate only LED sources 56b to exclusively illuminate a portion 100 of the light-producing assembly 48 in the second color. It should be appreciated that the light-producing assembly 48 may include any number of portions 98, 100 having varying LED sources 56a, 56b that may illuminate in any desired color. Moreover, it should also be appreciated that the portions having varying LED sources 56a, 56b may be orientated in any practicable manner and need not be disposed adjacently.

As described above, a photoluminescent structure 42 may be disposed on a portion of the light-producing assembly 48. If desired, any of the LED sources 56a, 56b may be utilized for exciting any photoluminescent material 10 disposed proximately to and/or on the light source 28.

The semiconductor ink 58 may also contain various concentrations of LED sources 56a, 56b such that the density of the LED sources 56a, 56b, or number of LED sources 56a, 56b per unit area, may be adjusted for various lighting applications. In some embodiments, the density of LED sources 56a, 56b may vary across the length of the light source 28. For example, a central portion 100 of the light-producing assembly 48 may have a greater density of LED sources 56 than peripheral portions 98, or vice versa. In such embodiments, the light source 28 may appear brighter or have a greater luminance in order to preferentially illuminate pre-defined locations. In other embodiments, the density of LED sources 56a, 56b may increase or decrease with increasing distance from a preselected point. In some embodiments, the LED sources 56 and semiconductor ink 58 may be sourced from Nth Degree Technologies Worldwide Inc.

Figure 5A:
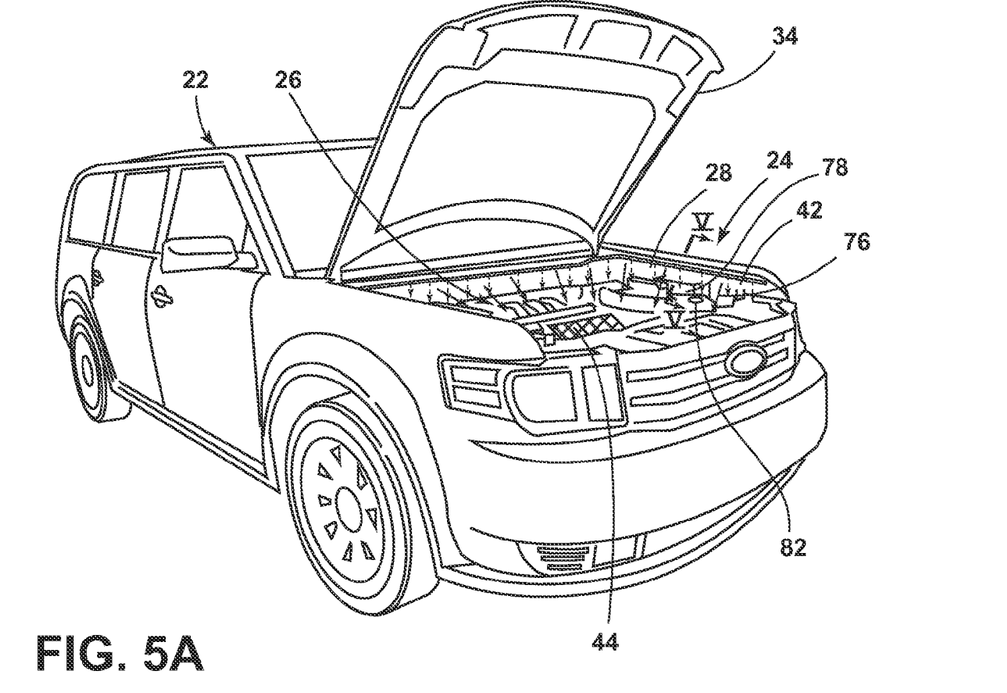
FIG. 5A is a perspective view of a vehicle engine compartment employing an illumination system further including luminescent engine features.

Referring to FIG. 5A, the light source 28 may be configured to direct light 76 emitted from the light source 28 toward the photoluminescent portions 42, 44 and/or the vehicle engine compartment 26. For example, the light source 28 may be connected to the periphery 32 of the vehicle compartment 26 such that the light 76 emitted from the light source 28 is focused centrally at the engine compartment 26 and downwardly along the periphery 32 simultaneously. The centrally focused light may illuminate features within the compartment 26. The downwardly directed light may provide backlighting for the compartment 26.

In response to the light 76 emitted from the light source 28 being received by the first photoluminescent portion 42, the energy conversion layer 16 may become excited and emit light 78 at a second wavelength. As discussed previously herein, the light 78 at a second wavelength may comprise a plurality of wavelengths to generate a significantly white light. The light 78 at a second wavelength is generally directed toward the engine compartment 26 such that a plurality of features 46 may be illuminated. The utility light configuration of the first photoluminescent portion 42 may provide uniform lighting throughout the engine compartment 26.

The light 76 emitted from the light source 28 is further directed from the light source 28 into the engine compartment 26 to excite a conversion layer 16 in one or more photoluminescent portions 44, 82 applied as a coating to and/or disposed in a matrix (e.g. the polymer matrix) on any number of the plurality of compartments or features 46 within the engine compartment 26. For example, the second photoluminescent portion 44 may be incorporated on an air intake and an engine cover; the third photoluminescent portion 82 may be incorporated on a fluid container lid. In response to receiving light 76 at the first wavelength, each of the plurality of photoluminescent portions 42, 44, 82 may become excited. The excitation may cause the second photoluminescent portion 44 to emit light at different wavelengths from the light 76 emitted from the light source 28.

Though the plurality of photoluminescent portions 42, 44, 82 are specifically discussed in reference to four exemplary portions, the plurality of photoluminescent portions 42, 44, 82 may correspond to any number of portions proximate the engine compartment 26 according to other embodiments. Each of the plurality of photoluminescent portions 42, 44, 82 may further include various energy conversion layers including various photoluminescent materials configured to emit a wide variety of colors in response to the light 76 emitted from the light source 28. As such, the lighting system 24 may be utilized in a variety of settings to provide the utility light and/or illuminate and accent any number of features 46.

The plurality of features 46 may comprise any feature 46 related to the vehicle 22 that may be disposed generally proximate the engine compartment 26 and/or the closure (e.g., the hood 34). Any of the plurality of features 46 may incorporate a photoluminescent structure 10 applied as a coating, and/or dispersed in a material structure that may illuminate and emit light 78 in response to receiving light 76 emitted from the light source 28. Each of the photoluminescent portions 42, 44, 82 may be illuminated in a single color or multiple colors to provide a desired color pallet and appearance for illuminating the plurality of features 46. The photoluminescent portions 44, 82 may further be utilized to identify one or more of the plurality of features 46 for easy identification during maintenance.

Figure 5B:
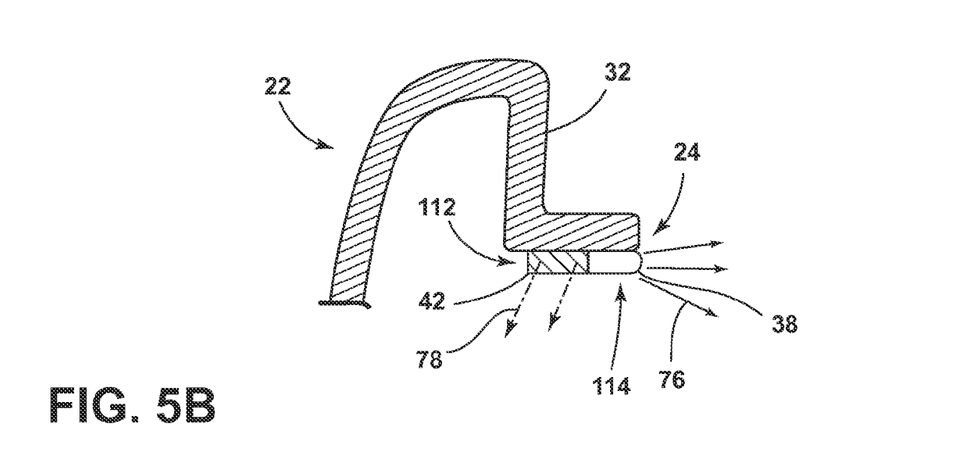
FIG. 5B is a cross-sectional view taken along line V-V of FIG. 5A illustrating a vehicle engine compartment employing an illumination system according to an alternative embodiment.

Referring to FIGS. 5A and 5B, the lighting system 24 is illustrated having a light-producing assembly 48 disposed on a vertical, interior surface 30 of the vehicle engine compartment wall 96. The light-producing assembly 48 may be coupled to the wall 96 through any known means, such as through an adhesive on the back side of the light-producing assembly 48. Alternatively, a magnet may be disposed on the back of the light-producing assembly 48 so that the light-producing assembly 48 may be moved to and coupled to a desired location within the engine compartment 26.

As described above, the light-producing assembly 48 may include a plurality of LED sources 40, 80. The light-producing assembly 48 may be configured to function as a utility light around the any portion of the compartment 26 and/or may be configured to excite photoluminescent portions 44, 82 disposed in a plurality of features 46 within the engine compartment 26.

In some embodiments, at least one fluid fill cap 82, dip stick, and/or any other feature 46 may include a photoluminescent portion 44 configured to emit an identifying color. The identifying color may be emitted in response to the feature 46 receiving light 76 emitted from the light source 28. The identifying color may be configured to correspond to a color described in a vehicle user manual or maintenance instructions. In some embodiments, the plurality of the photoluminescent portions 42, 44, 82 may correspond to a plurality of identifying colors configured to identify, categorize, and/or provide for a first feature 46 having a first color to be visually discernible from a second feature 46 having a second color. In this way, the lighting system 24 may provide additional utility by providing decorative lighting that may serve to aid in identifying various features 46 located proximate the engine compartment 26.

Referring to FIG. 5B, an exemplary cross section of the lighting system 24 is illustrated connected to a bottom surface around the periphery 32 of the engine compartment 26. The lighting system 24 includes a light-producing assembly 48, similar to that described in FIG. 3A, having an outer portion 112 with the first photoluminescent portion 42 disposed thereon. When illuminated, the outer portion 112 may provide backlighting for the engine compartment 26.

The inner portion 114 of the light-producing assembly 48 may include a light transmissive portion 72 thereby emitting light from the light-producing assembly 48 at the first wavelength 76. The light emitted at the first wavelength 76 may be directed towards features 46 within the engine compartment 26 having photoluminescent portions 44 thereon that are illuminated in response to the emitted light 76. The light 76 may be directed towards pre-defined locations through the use of optics 38, as described above. Further, the optics 38 utilized may direct light a portion of in a direction that is offset by an angle of up to 180 degrees from the light emitted from other portions of the light-producing assembly 48. In some embodiments, the light source 28 may be vertically disposed above the majority of features 46 within the engine compartment 26 such that the light source 28 may be capable of illuminating any position within the compartment 26. It should be appreciated that the lighting system 24 may be mounted and/or connected in any position of the compartment. Additionally, it should also be appreciated that any number of portions of light may be directed in any desired direction.

Figure 6:
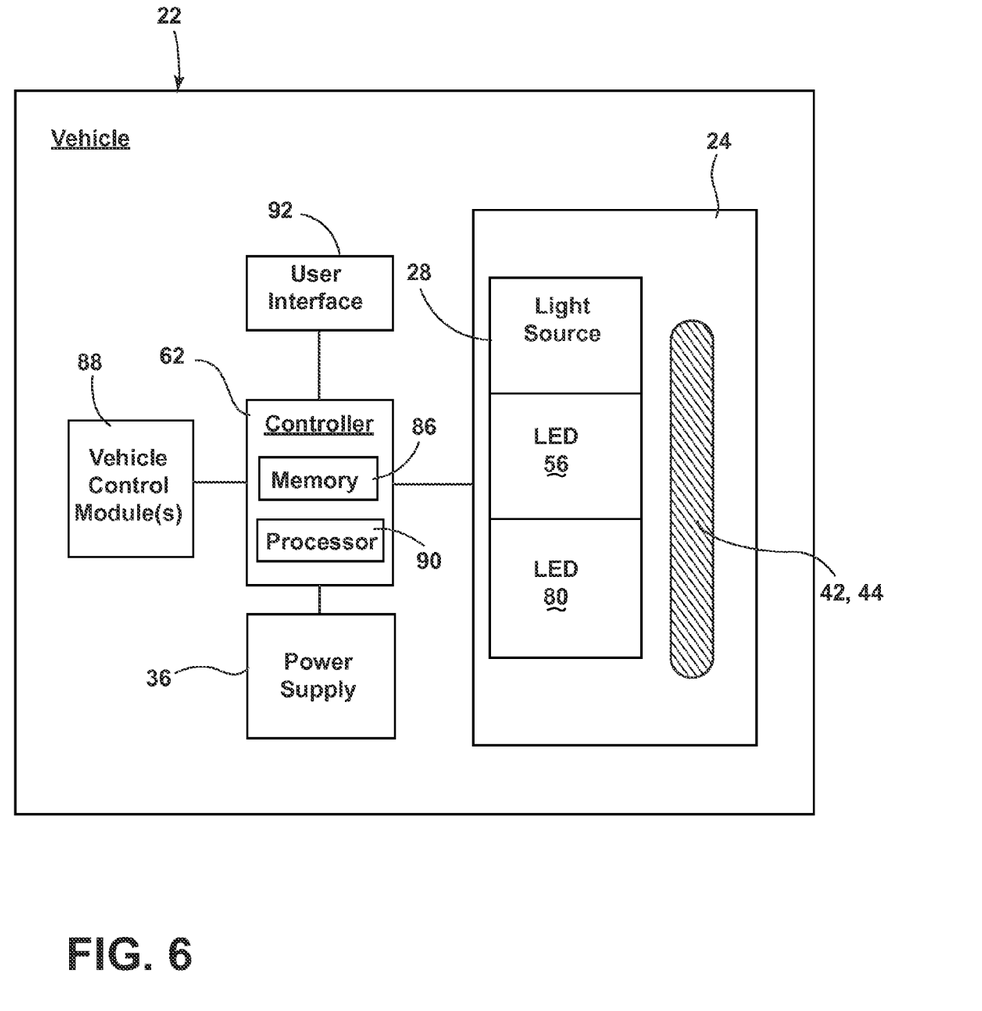
FIG. 6 is block diagram of the vehicle and the illumination lighting system.

Referring to FIG. 6, a block diagram of a vehicle 22 is shown in which the lighting system 24 is implemented. The lighting system 24 includes a controller 62 in communication with the light source 28. The controller 62 may include memory 86 having instructions contained therein that are executed by a processor 90 of the controller 62. The controller 62 may provide electrical power to the light source 28, or to a respective bus bar 64, 66, via a power supply 36 located onboard the vehicle 22. In addition, the controller 62 may be configured to control the light 76 output of each light source 28 based on feedback received from one or more vehicle control modules 88 such as, but not limited to, a body control module, engine control module, steering control module, brake control module, the like, and/or a combination thereof. By controlling the light 76 output of the light source 28, the lighting system 24 may illuminate in a variety of colors and/or patterns to provide an aesthetic appearance, or may provide vehicle information to an intended observer. For example, when a vehicle hood 34 is ajar, the light-producing assembly 48 may illuminate and/or features 46 within the engine compartment 26 may be illuminated or excited.

In operation, each photoluminescent portion 42, 44 may exhibit a constant unicolor or multicolor illumination. For example, the controller 62 may prompt the light source 28 to emit only the first wavelength of light 76 via an LED 56 to cause a photoluminescent portion 42, 44 to illuminate in the first color (e.g., white). Alternatively, the controller 62 may prompt the light source 28 to emit only the second wavelength of light via the LED 80 to cause the photoluminescent portions 42, 44 to illuminate in the second color (e.g., red). Alternatively still, the controller 62 may prompt the light source 28 to simultaneously emit the first and second wavelengths of light to cause the photoluminescent portions 42, 44 to illuminate in a third color (e.g. pinkish) defined by an additive light mixture of the first and second colors. Moreover, additional photoluminescent portions 82 may be added to the lighting system 24 that converts the light 76 emitted from the light source 28 to a different wavelength.

In another embodiment, the lighting system 24 may include a user interface 92. The user interface 92 may be configured such that a user may control the wavelength of light 76 that is emitted by the LEDs 40 and/or the LEDs that are illuminated. Such a configuration may allow a user to control which features 46 are illuminated to assist in locating a desired feature 46 (e.g., oil cap 82). The user interface 92 may be disposed within the vehicle 22 cabin or on any surface that is accessible to the user during utilization of the lighting system 24 described herein. The user interface 92 may use any type of control known in the art for control the light source 28, such as, but not limited to, proximity sensors.

In an alternate embodiment, the photoluminescent portions 42, 44 may exhibit periodic unicolor or multicolor illumination. For example, the controller 62 may prompt the light source 28 to periodically emit only the first wavelength and intensity of light 76 via the LEDs 40 to cause the photoluminescent portions 42 to periodically illuminate in the first color. Alternatively, the controller 62 may prompt the light source 28 to periodically emit only the second wavelength of light via LED 80 to cause the photoluminescent portions 42, 44 to periodically illuminate in the second color. Alternatively, the controller 62 may prompt the light source 28 to simultaneously and periodically emit the first and second wavelengths of light to cause the photoluminescent portions 42, 44 to periodically illuminate in a third color defined by an additive light mixture of the first and second colors. Alternatively still, the controller 62 may prompt the light source 28 to alternate between periodically emitting the first and second wavelengths of light to cause the photoluminescent portion 42 to periodically illuminate by alternating between the first and second colors. The controller 62 may prompt the light source 28 to periodically emit the first and/or second wavelengths of light at a regular time interval and/or an irregular time interval.

With respect to the above examples, the controller 62 may modify the intensity of the emitted first and second wavelengths of light by pulse-width modulation or current control. In some embodiments, the controller 62 may be configured to adjust a color of the emitted light by sending control signals to adjust an intensity or energy output level of the light source 28. For example, if the light source 28 is configured to output the first emission at a low level, substantially all of the inputted light 76 may be converted to the outputted, visible light 78. If the light source 28 is configured to emit inputted light 76 at a high level, only a portion of the inputted light 76 may be converted to the outputted light 78 by the photoluminescent portion 42. In this configuration, a color of light corresponding to mixture of the inputted light 76 and the outputted light 78 may be output as the emitted light. In this way, each of the controllers 62 may control an output color of the emitted light.

Though a low level and a high level of intensity are discussed in reference to the inputted light 76, it shall be understood that the intensity of the inputted light 76 may be varied among a variety of intensity levels to adjust a hue of the color corresponding to the emitted light from the lighting system 24. As described herein, the color of the outputted light 78 may be significantly dependent on the particular photoluminescent structures 10 utilized in the photoluminescent portion 42. Additionally, a conversion capacity of the photoluminescent portion 42 may be significantly dependent on a concentration of the photoluminescent structures 10 utilized in the photoluminescent portion 42. By adjusting the range of intensities that may be emitted from the light source 28, the concentration and proportions of the photoluminescent structures 10 in the photoluminescent portion 42 and the types of photoluminescent materials utilized in the photoluminescent portion 42 discussed herein may be operable to generate a range of color hues of emitted light by blending the inputted light 76 with the outputted light 78. It is also contemplated that the intensity of each light source 28 may be varied simultaneously, or independently, from any number of other light sources 28.

Accordingly, an illuminated compartment lighting system has been advantageously described herein. The lighting system may provide various benefits including a simple and cost-effective means to produce a variety of illumination that may be used as a styling feature and/or to assist an occupant in the usage of the illuminated engine compartment assembly.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An illuminated compartment for a vehicle, comprising:
   a light-producing assembly;
   a first luminescent portion disposed on the light-producing assembly configured to luminesce in response to excitation by the light-producing assembly;
   a second luminescent portion disposed on a feature within a vehicle engine compartment configured to luminesce in response to excitation by the light-producing; and
   a controller for controlling an activation state of the light-producing assembly in response to at least one vehicle related condition.

2. The illuminated compartment for a vehicle of claim 1, wherein the light-producing assembly comprises a printed LED.

3. The illuminated compartment for a vehicle of claim 2, wherein the light-producing assembly comprises a plurality of LED sources and the first and second luminescent portions comprise at least one photoluminescent material, wherein each photoluminescent material is configured to down convert an inputted light received from at least a portion of the plurality of LED sources into a visible light.

4. The illuminated compartment for a vehicle of claim 3, wherein the inputted light comprises one of a blue light, violet light, and a UV light.

5. The illuminated compartment for a vehicle of claim 1, wherein the first luminescent portion partially covers a top surface of the light-producing assembly.

6. The illuminated compartment for a vehicle of claim 1, wherein the controller determines at least one of a light emission intensity and a light emission duration of the light-producing assembly.

7. The illuminated compartment for a vehicle of claim 1, wherein the light emitted from the light-producing assembly comprises one of a blue light, violet light, and a UV light.

8. A lighting system for a vehicle, comprising:
   a printed LED capable of being coupled to a vehicle surface;

a first photoluminescent structure partially covering the printed LED and configured to luminesce in response to excitation by the printed LED;

a light transmissive portion disposed adjacently to the first photoluminescent structure; and a second photoluminescent structure configured to luminesce in response to light emitted from the printed LED, wherein the second photoluminescent structure is disposed on a feature within an engine compartment to receive light from the printed LED via the light transmissive portion.

9. The lighting system of claim 8, wherein the first photoluminescent structure illuminates in a first color and the second photoluminescent structure illuminates in a second color.

10. An illuminated engine compartment, comprising:

a light-producing assembly emitting light at a first wavelength;

a first photoluminescent portion arranged over the light-producing assembly configured to luminesce in response to excitation by the light-producing assembly, wherein a fraction of the light passes through the first photoluminescent portion at the first wavelength for use as a utility light; and a second photoluminescent portion disposed within the compartment that luminesces in response to the light at the first wavelength for illuminating at least one feature of the engine compartment.

11. The illuminated compartment of claim 10, wherein the light-producing assembly comprises a printed LED.

12. The illuminated compartment of claim 10, wherein the light-producing assembly is coupled to a hood.

13. The illuminated compartment of claim 10, wherein the light-producing assembly is connected to an interior vertical wall surrounding the engine compartment.

14. The illuminated compartment of claim 10, wherein the light-producing assembly is disposed proximate a forward portion of an engine compartment.

15. The illuminated compartment of claim 10, further comprising a controller configured to selectively illuminate the light-producing assembly.

16. The illuminated compartment of claim 10, wherein the light-producing assembly comprises a plurality of LED sources and the first photoluminescent portion comprises at least one photoluminescent material, wherein the at least one photoluminescent material is configured to down convert an inputted light received from at least a portion of the plurality of LED sources into a visible light.

* * * * *

UNITED STATES PATENT AND TRADEMARK OFFICE
CERTIFICATE OF CORRECTION

PATENT NO.         : 9,434,304 B2                              Page 1 of 1
APPLICATION NO.    : 14/718867
DATED              : September 6, 2016
INVENTOR(S)        : Stuart C. Salter et al.

It is certified that error appears in the above-identified patent and that said Letters Patent is hereby corrected as shown below:

Column 16, Claim 1, Line 38:
After "light-producing" insert --assembly--.

Signed and Sealed this
Seventh Day of March, 2017

Michelle K. Lee
*Director of the United States Patent and Trademark Office*